United States Patent
Chan et al.

(10) Patent No.: US 10,759,715 B2
(45) Date of Patent: Sep. 1, 2020

(54) METHOD OF PRODUCING A POROUS CRYSTALLINE MATERIAL WITH A HIGHLY UNIFORM STRUCTURE

(71) Applicant: THE UNIVERSITY OF HONG KONG, Hong Kong (HK)

(72) Inventors: Kwong Yu Chan, Hong Kong (HK); Albert Voskanyan, Gyumri (AM); Chi Ying Vanessa Li, Hong Kong (HK)

(73) Assignee: THE UNIVERSITY OF HONG KONG, Hong Kong (HK)

( * ) Notice: Subject to any disclaimer, the term of this patent is extended or adjusted under 35 U.S.C. 154(b) by 0 days.

(21) Appl. No.: 16/076,724

(22) PCT Filed: Feb. 22, 2017

(86) PCT No.: PCT/CN2017/074353
§ 371 (c)(1),
(2) Date: Aug. 9, 2018

(87) PCT Pub. No.: WO2017/143978
PCT Pub. Date: Aug. 31, 2017

(65) Prior Publication Data
US 2019/0062225 A1    Feb. 28, 2019

Related U.S. Application Data

(60) Provisional application No. 62/298,033, filed on Feb. 22, 2016.

(51) Int. Cl.
*C04B 38/00* (2006.01)
*B01J 21/06* (2006.01)
(Continued)

(52) U.S. Cl.
CPC ......... *C04B 38/0045* (2013.01); *B01J 21/063* (2013.01); *B01J 21/066* (2013.01);
(Continued)

(58) Field of Classification Search
CPC ............... B01J 37/082; C04B 38/0645; C04B 38/0054; B82Y 40/00
See application file for complete search history.

(56) References Cited

U.S. PATENT DOCUMENTS 5,279,737 A * 1/1994 Sekhar ............... B01D 39/2051
210/490
5,611,953 A * 3/1997 Sekhar .............. C04B 35/58092
219/553
(Continued)

FOREIGN PATENT DOCUMENTS

WO    2012/171655    12/2012

OTHER PUBLICATIONS

Chiu et al. Synthesis of nanosized CuCrO2 porous powders via a self-combustion glycine nitrate process. Journal of Alloys and Compounds. vol. 509, Issue 6, Feb. 10, 2011, pp. 2933-2935.*
(Continued)

*Primary Examiner* — Noah S Wiese
(74) *Attorney, Agent, or Firm* — Amin, Turocy & Watson, LLP (57) ABSTRACT

Described herein is a scalable, economic, energy and time efficient method for the synthesis of a crystalline uniform nanoporous oxide material by utilizing colloidal particles in solution combustion synthesis. By removing colloids from nanocomposite via chemical etching crystalline uniform porous oxide is prepared with tailored porosity. The produced oxides have high specific surface area, high pore volume, uniform pore structure and high crystallinity. Properties of the oxide can be tuned by the concentration and size of colloids added, which affects the porous structure (mesopore diameter, pore wall thickness, surface area, and pore
(Continued)

volume). In principle, this method can be applied to synthesize different high porosity crystalline metal oxides and nanocomposites.

13 Claims, 7 Drawing Sheets

(51) Int. Cl.
| | | |
|---|---|---|
| *B01J 35/10* | (2006.01) | |
| *B01J 23/10* | (2006.01) | |
| *B01J 23/72* | (2006.01) | |
| *B01J 23/46* | (2006.01) | |
| *B01J 35/00* | (2006.01) | |
| *B01J 23/52* | (2006.01) | |
| *B01J 23/745* | (2006.01) | |
| *B01J 23/75* | (2006.01) | |
| *B01J 23/42* | (2006.01) | |
| *B01J 37/08* | (2006.01) | |
| *B01J 37/06* | (2006.01) | |
| *B01J 23/44* | (2006.01) | |
| *B01J 23/50* | (2006.01) | |
| *B01J 23/755* | (2006.01) | |
| *C04B 38/06* | (2006.01) | |
| *B82Y 40/00* | (2011.01) | |
| *B82Y 30/00* | (2011.01) | |

(52) U.S. Cl.
CPC ............... *B01J 23/10* (2013.01); *B01J 23/42* (2013.01); *B01J 23/44* (2013.01); *B01J 23/462* (2013.01); *B01J 23/464* (2013.01); *B01J 23/50* (2013.01); *B01J 23/52* (2013.01); *B01J 23/72* (2013.01); *B01J 23/745* (2013.01); *B01J 23/75* (2013.01); *B01J 23/755* (2013.01); *B01J 35/002* (2013.01); *B01J 35/0013* (2013.01); *B01J 35/1061* (2013.01); *B01J 35/1066* (2013.01); *B01J 37/06* (2013.01); *B01J 37/082* (2013.01); *C04B 38/0054* (2013.01); *C04B 38/069* (2013.01); *C04B 38/0645* (2013.01); *B82Y 30/00* (2013.01); *B82Y 40/00* (2013.01)

(56) References Cited

U.S. PATENT DOCUMENTS

2009/0311169 A1* 12/2009 Rajeshwar ............ B82Y 30/00
423/606
2012/0068124 A1   3/2012 Dickinson et al.

OTHER PUBLICATIONS

Velev et al. Structured Porous Materials via Colloidal Crystal Templating: From Inorganic Oxides to Metals. Adv. Mater. 2000, 12, No. 7, pp. 531-534.*
International Search Report and Written Opinion for International Application No. PCT/CN2017/074353 dated May 11, 2017, 9 pages.

* cited by examiner

METHOD OF PRODUCING A POROUS CRYSTALLINE MATERIAL WITH A HIGHLY UNIFORM STRUCTURE

TECHNICAL FIELD

Embodiments described herein are directed to a mass production method of a nanomaterial, in particular to a fabrication method of a crystalline uniform nanoporous oxide material with a nanocomposite intermediate by using colloids in solution combustion synthesis.

BACKGROUND

Porous crystalline metal oxides are normally synthesized using templating techniques, which are generally categorized into the soft or hard template method depending on the nature of the templates used. For the soft template method, surfactants or amphiphilic block copolymers are employed as structure-directing agents. Since surfactants cannot sustain high temperature, prolonged high-temperature heat treatment cannot be applied and the obtained metal oxides are amorphous or semi-crystalline. The hard templating method for preparing mesoporous oxides was developed to overcome the problems associated with the soft templating method. In hard templating method, inorganic precursors are impregnated into pre-formed ordered mesoporous silica or carbon template and heated at elevated temperatures to obtain crystalline oxide without structural collapse. However, this method of production of mesoporous oxides is still far from commercialization as the initial templates used, i.e. SBA-15, KIT-6, CMK-3 are very expensive and overall synthetic process is capital-expensive. Thus, it is of utmost importance to develop new, efficient synthetic strategies to produce high quality, crystalline mesoporous metal oxides economically at a large scale.

Recently, solution combustion synthesis (SCS) has become a popular method to mass produce nanosize crystalline metal oxides in an energy and time efficient manner. High temperature required for crystals nucleation is achieved by the self-generated heat. Moreover, rapid cooling (typically a few seconds) does not provide sufficient time for extended crystal growth, leading to nanoscale crystals. Despite the many advantages of SCS, commercialization is discouraged by the poor control of porous structure in the metal oxides produced.

SUMMARY

Given the shortcomings described above, the inventors herein provide new, efficient synthetic strategies to produce high quality, crystalline, uniformly porous metal oxides economically at a large scale. Described herein is the simple scalable production of a mesoporous nanomaterial by using colloidal solution combustion synthesis (CSCS) wherein the colloidal nanoparticles have uniform arrangement in nanocomposite produced and nanocomposite can be composed of oxide/oxide, oxide/metal or metal/oxide possessing unique nanostructure.

The preparation method of uniform nanoporous material by using colloidal nanoparticles is provided and comprised of the following steps. Colloidal nanoparticles are added to an aqueous solution of nitrate and fuel. For example, the colloidal nanoparticles can be added to an aqueous solution of nitrate and fuel in any appropriate ratio according to the knowledge of the persons skilled in the art and the concrete technical solution disclosed by the present application text. Upon heating and water evaporation, a gel is formed between assembled colloids followed by self-ignition. After the ignition, the exothermic reaction leads to formation of nanocomposite material with a uniform arrangement having colloidal nanoparticles embedded. The colloidal particles then can be removed by a chemical etching to yield a uniform porous crystalline nanomaterial. It should be emphasized here, no additional heat treatment is needed after combustion.

The fuel can be selected from the group consisting of amino acid, amide, thioamide, citrate, oxalate, alcohol, hydrazine and its derivatives, or amine and combinations thereof.

The nitrate can be one or more selected from the group consisting of $Ce(NO_3)_3$, $Cu(NO_3)_2$, $Pd(NO_3)_2$, $Al(NO_3)_3$, $AgNO_3$, $Zn(NO_3)_2$, $TiO(NO_3)_2$, $ZrO(NO_3)_2$, $Ni(NO_3)_2$, $Co(NO_3)_2$, $Mg(NO_3)_2$, $Sr(NO_3)_2$, $Ba(NO_3)_2$, $Y(NO_3)_3$, $LiNO_3$, $NaNO_3$, $KNO_3$, $Cr(NO_3)_3$, $Mn(NO_3)_2$, $Bi(NO_3)_3$, $Mg(NO_3)_2$, $Pb(NO_3)_2$, $La(NO_3)_3$, $NH_4NO_3$, $Ce(NH_4)_2(NO_3)_6$, $Pr(NO_3)_3$, $Sm(NO_3)_3$, $Eu(NO_3)_3$, $In(NO_3)_3$, $Gd(NO_3)_3$, $Sc(NO_3)_3$ or $Tb(NO_3)_3$ and combinations thereof.

The colloid can be selected from the group consisting of $SiO_2$, $Al_2O_3$, $CeO_2$, $Fe_2O_3$, $TiO_2$, $ZrO_2$, $Fe_3O_4$, $ZnO$, $WO_3$, $CuO$, $Cu_2O$, $MoO_3$, $Y_2O_3$, $Sm_2O_3$, $Gd_2O_3$, $Co_3O_4$, $Ag$, $Au$, $Pt$, $Pd$, $Ru$, $Rh$, $Ni$, $Co$, $Fe$, $Cu$, $Zr$ or $Ti$ and combinations thereof.

The diameter of colloids used is in the range of 2-200 nm and hence the pores formed after the chemical etching have the size in the same range or substantially the same range.

Simple and scalable method involves low costs precursors and mass production is promised by the low energy and capital requirements, in contrast to soft templating and nanocasting methods.

With the presence of a colloid, SCS is significantly modified in several fundamental aspects. Metal oxides synthesized by our invented method have around 6-8-fold increase in surface area, 8-10-fold increase in pore volume, a narrow pore size distribution, uniform porosity, and 3-5-fold smaller particle size.

Invented method has the essential features for economic mass production of uniform nanoporous crystalline metal oxides or nanocomposites with specific properties. The synthesis is fast, energy efficient, and low costs in materials and equipment. The addition of a colloidal solution limits combustion to take place in confined and uniformly distributed nanospace, leading to very uniform porous structure. Properties of the product can be tuned by the concentration, size of colloids added and surface charge of colloids, which governs the porous structure formation (mesopore diameter, pore wall thickness, surface area, pore volume). The presence of colloids also allows alteration of heat transfer and heat balance of solution combustion, leading to tunable crystallinity and particle size.

Compared to the general hard templating, our invented colloidal solution combustion synthesis method has the following advantages: 1) the high-temperature supply comes from exothermic chemical reaction instead of external heating; 2) kilogram scale of nanoporous material can be produced within short time 3) the colloidal silica nanoparticles are much cheaper than commonly used other templates; 4) the synthetic process is ultrafast and eliminates the need of the tedious impregnation step.

The present application comprises the following embodiments:

1. A method of synthesizing a porous material via combustion of a colloidal solution comprising:

a) preparing a colloidal solution by dissolving in water a fuel and a metal nitrate and optional metal precursor, and dispersing colloidal particles in an appropriate ratio, preferably the oxidant is also the metal precursor;

b) heating the solution to ignition and initiate a combustion to produce a composite material comprising colloidal particles via an exothermic process and c) dissolving the colloidal particles to create uniform porosity.

2. The method of the above embodiment wherein fuel comprises of amino acid, amide, thioamide, citrate, oxalate, alcohol, hydrazine and its derivative, or amine and combinations thereof.

3. The method of any one of the above embodiments wherein the amino acid is one or more of glycine, alanine, arginine, asparagine, aspartic acid, cysteine, glutamine, proline, and tryptophan.

4. The method of any one of the above embodiments wherein the amide is formamide, ethanamide, propanamide, or butanamide.

5. The method of any one of the above embodiments wherein the thioamide is thioformamide, thioethanamide, thiopropanamide, or thiobutanamide.

6. The method of any one of the above embodiments wherein the citrate is citric acid, trisodium citrate, or ammonium citrate.

7. The method of any one of the above embodiments wherein the oxalate is oxalic acid, or dimethyl oxalate.

8. The method of any one of the above embodiments wherein the alcohol is ethylene glycol, glycerol, or furfuryl alcohol.

9. The method of any one of the above embodiments wherein the hydrazine and its derivative is hydrazine hydrate, hydrazine hydrochloride, acetyl hydrazine, 1,2,4-triazole, 2-amino1,2,4-triazole, or 4-amino1,2,4-triazole.

10. The method of any one of the above embodiments wherein the amine is ethylene diamine 11. The method of any one of the above embodiments wherein the oxidant is a nitrate.

12. The method of any one of the above embodiments wherein the nitrate comprises one or more of $Ce(NO_3)_3$, $Cu(NO_3)_2$, $Pd(NO_3)_2$, $Al(NO_3)_3$, $AgNO_3$, $Zn(NO_3)_2$, $TiO(NO_3)_2$, $ZrO(NO_3)_2$, $Ni(NO_3)_2$, $Co(NO_3)_2$, $Mg(NO_3)_2$, $Sr(NO_3)_2$, $Ba(NO_3)_2$, $Y(NO_3)_3$, $LiNO_3$, $NaNO_3$, $KNO_3$, $Cr(NO_3)_3$, $Mn(NO_3)_2$, $Bi(NO_3)_3$, $Mg(NO_3)_2$, $Pb(NO_3)_2$, $La(NO_3)_3$, $NH_4NO_3$, $Ce(NH_4)_2(NO_3)_6$, $Pr(NO_3)_3$, $Sm(NO_3)_3$, $Eu(NO_3)_3$, $In(NO_3)_3$, $Gd(NO_3)_3$, $Sc(NO_3)_3$, or $Tb(NO_3)_3$.

13. The method of any one of the above embodiments wherein the colloidal particle comprises of an oxide or a metal and combinations thereof.

14. The method of any one of the above embodiments wherein the oxide is one or more of $SiO_2$, $Al_2O_3$, $CeO_2$, $Fe_2O_3$, $TiO_2$, $ZrO_2$, $Fe_3O_4$, $ZnO$, $WO_3$, $CuO$, $Cu_2O$, $MoO_3$, $Y_2O_3$, $Sm_2O_3$, $Gd_2O_3$, or $CO_3O_4$.

15. The method of any one of the above embodiments wherein metal is one or more of Ag, Au, Pt, Pd, Ru, Rh, Ni, Co, Fe, Cu, Zr or Ti.

16. The method of any one of the above embodiments wherein the ratio of nitrate to fuel is about to 5:1 to 0.5:1.

17. The method of any one of the above embodiments wherein the ratio of nitrate to colloid is about to 1:0.5 to 1:5.

18. The oxide of any one of the above embodiments wherein diameter is in a range from about 5 to about 200 nm.

19. The metal of any one of the above embodiments wherein diameter is in a range from about 2 to about 200 nm.

20. The method of any one of the above embodiments wherein during removing water from aqueous solution to obtain a gel, the heating rate is between 0.1 degree Celsius per minute and 50 or 100 degree Celsius per minute up to ignition of the gel, optionally in open air, wherein after the ignition the reaction is exothermic yielding oxide/colloid composite material.

21. The method of any one of the above embodiments wherein removal of the colloidal particle by chemical etching to produce uniform porous oxide, wherein chemical etching comprising of etching of colloid by NaOH, KOH, HF, HCl, $HNO_3$, $H_2SO_4$, KCN, or $CH_3COOH$ and combinations thereof.

22. The method of any one of the above embodiments wherein the pore diameter of porous oxide has a size from about 2 nm to about 200 nm.

23. A method of any one of the above embodiments comprising using a produced uniform porous oxide in a coating, polishing slurry or paste, a catalyst, a gas sensing device, an optical device, a battery device, a storage device, a ceramic, or a magnetic device.

24. A method of synthesizing a composite material via combustion of a colloidal solution comprising:

a) preparing a colloidal solution by dissolving in water a fuel and an oxidant and optional metal precursor, and dispersing colloidal particles in an appropriate ratio, preferably the oxidant is also the metal precursor; and b) heating the solution to ignition and initiate a combustion to produce a composite material comprising colloidal particles within an oxide via an exothermic process for applications as a coating, polishing slurry or paste, a catalyst, a gas sensing device, an optical device, a battery device, a storage device, a ceramic, or a magnetic device.

25. A method of making a porous nanomaterial, comprising:

combining colloidal nanoparticles with a nitrate and a fuel in an aqueous solution and optional metal precursor, preferably the oxidant is also the metal precursor;

heating the aqueous solution to form a gel;

permitting an exothermic reaction to proceed to form a nanocomposite material and removing colloidal nanoparticles from the nanocomposite material to provide a porous nanomaterial.

26. The method of any one of the above embodiments, wherein the nanocomposite material comprises colloidal nanoparticles embedded therein.

27. The method of any one of the above embodiments, wherein the porous nanomaterial comprises a porous crystalline nanomaterial.

28. The method of any one of the above embodiments, wherein the porous nanomaterial comprises pores having a diameter from 2 to 200 nm or 2 to 100 nm.

29. The method of any one of the above embodiments, wherein the colloidal nanoparticles are removed from the nanocomposite material by chemical etching.

30. The porous material produced by the method of any one of the above embodiments.

31. The composite material produced by the method of any one of the above embodiments.

32. The porous nanomaterial produced by the method of any one of the above embodiments.

The present application further comprises a material produced by the method of any one of the above embodiments where a second metal precursor, such as a chloride, sulfate, or sulfide of a metal, which do not support combustion of the fuel as in the case of metal nitrates, are added to become a dopant or an active component (such as a minor active component, or a major active component) in the final porous material or the final oxide product.

In any one of the above embodiments, the oxidant may comprise oxygen.

DETAILED DESCRIPTION

Figure 1:
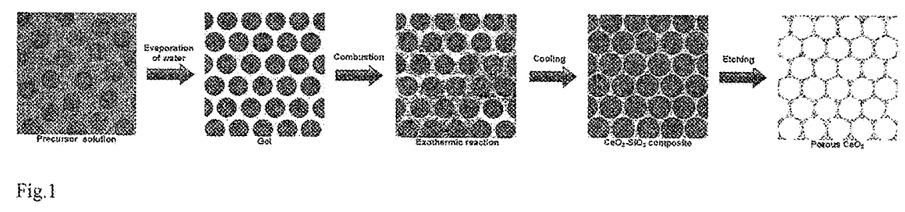
FIG. 1. Schematic of synthesizing crystalline nanocomposite or uniform nanoporous oxide with tailored porosity: (a) colloidal solution (b) gel (c) combustion confined by colloids (d) nanocomposite with periodically arranged colloids (e) highly nanoporous oxide after etching of colloidal particles in accordance with the invention.

With reference to FIG. 1, the invention provides scalable method of manufacturing uniform porous nanomaterials by using colloidal particles as a template in solution combustion synthesis wherein the colloids have uniform arrangement in nanocomposite produced and nanocomposite composed of oxide/oxide, oxide/metal or metal/oxide possessing unique nanostructure. The preparation method of uniform porous crystalline nanomaterial by using colloidal nanoparticles is provided and method comprises of the following steps. First, colloidal nanoparticles are added to an aqueous solution of nitrate and fuel. Upon heating and water evaporation, a gel is formed between assembled colloids followed by self-ignition. After ignition, the reaction is exothermic resulting in the formation of nanocomposite material with embedded colloidal nanoparticles having a uniform arrangement. The colloidal particles then can be removed by a chemical etching to yield a uniform porous crystalline nanomaterial.

The fuel used in this embodiment may be a glycine, alanine, arginine, asparagine, aspartic acid, cysteine, glutamine, proline, tryptophan, formamide, ethanamide, propanamide, butanamide, thioamide, thioformamide, thioethanamide, thiopropanamide, thiobutanamide, citric acid, trisodium citrate, ammonium citrate, oxalic acid, dimethyl oxalate, ethylene glycol, glycerol, furfuryl alcohol, hydrazine hydrate, hydrazine hydrochloride, acetylhydrazine, 1,2, 4-triazole, 2-amino1,2,4-triazole, 4-amino1,2,4-triazole, or ethylenediamine and combinations thereof.

The metal nitrate used in this embodiment may be a $Ce(NO_3)_3$, $Cu(NO_3)_2$, $Pd(NO_3)_2$, $Al(NO_3)_3$, $AgNO_3$, $Zn(NO_3)_2$, $TiO(NO_3)_2$, $ZrO(NO_3)_2$, $Ni(NO_3)_2$, $Co(NO_3)_2$, $Mg(NO_3)_2$, $Sr(NO_3)_2$, $Ba(NO_3)_2$, $Y(NO_3)_3$, $LiNO_3$, $NaNO_3$, $KNO_3$, $Cr(NO_3)_3$, $Mn(NO_3)_2$, $Bi(NO_3)_3$, $Mg(NO_3)_2$, $Pb(NO_3)_2$, $La(NO_3)_3$, $NH_4NO_3$, $Ce(NH_4)_2(NO_3)_6$, $Pr(NO_3)_3$, $Sm(NO_3)_3$, $Eu(NO_3)_3$, $In(NO_3)_3$, $Gd(NO_3)_3$, $Sc(NO_3)_3$, or $Tb(NO_3)_3$. and combinations thereof.

The colloid used in this embodiment may be a $SiO_2$, $Al_2O_3$, $CeO_2$, $Fe_2O_3$, $TiO_2$, $ZrO_2$, $Fe_3O_4$, $ZnO$, $WO_3$, $CuO$, $Cu_2O$, $MoO_3$, $Y_2O_3$, $Sm_2O_3$, $Gd_2O_3$, $Co_3O_4$, Ag, Au, Pt, Pd, Ru, Rh, Ni, Co, Fe, Cu, Zr or Ti and combinations thereof.

The diameter of colloids used is in the range of 2-200 nm and hence the pores formed after the chemical etching have the size in the same range.

The pores in the uniform porous material can have a spherical, polyhedral, conical, cylindrical, ellipsoidal, and/or combinations thereof. The diameter can refer to an average interal diameter, the smallest internal diameter, or the largest interal diameter. In one embodiment, 95% of the pores in the uniform porous material have the same shape. In another embodiment, 99% of the pores in the uniform porous material have the same shape.

Figure 2:
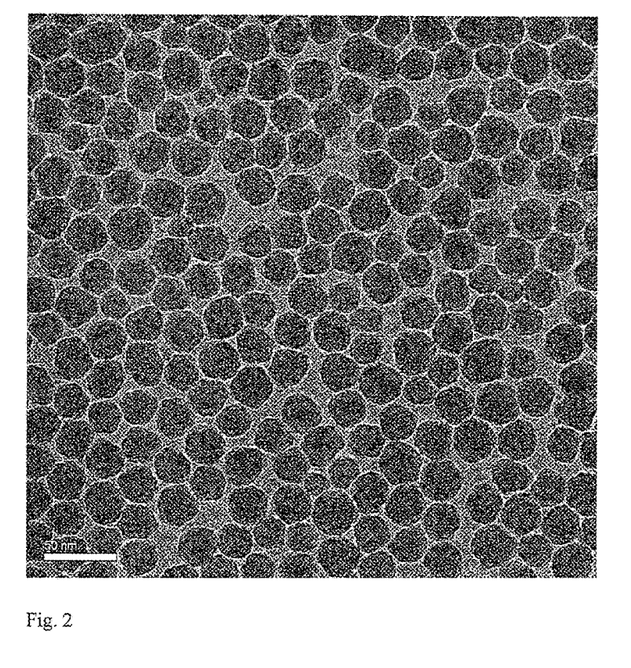
FIG. 2. TEM image of initial colloidal $SiO_2$.
Figure 3:
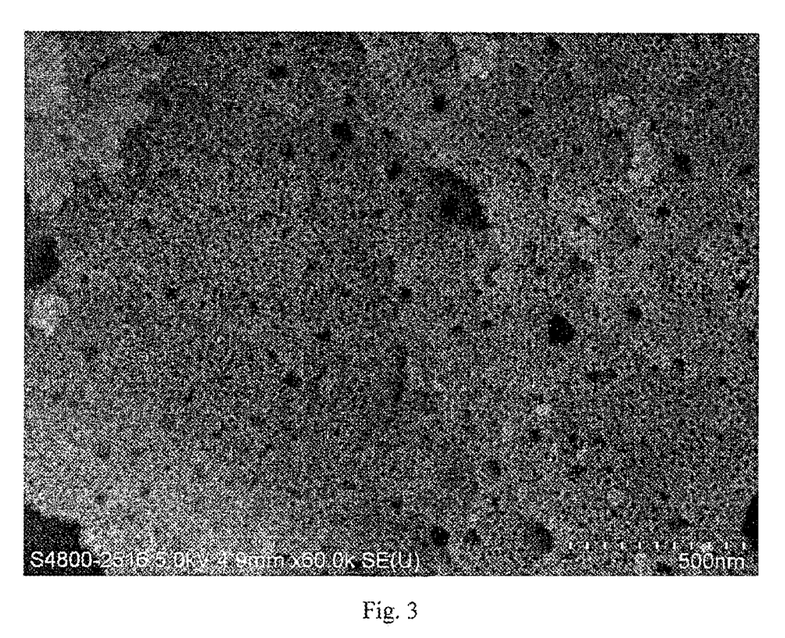
FIG. 3. SEM image of $CeO_2$ after etching of $SiO_2$.
Figure 4:
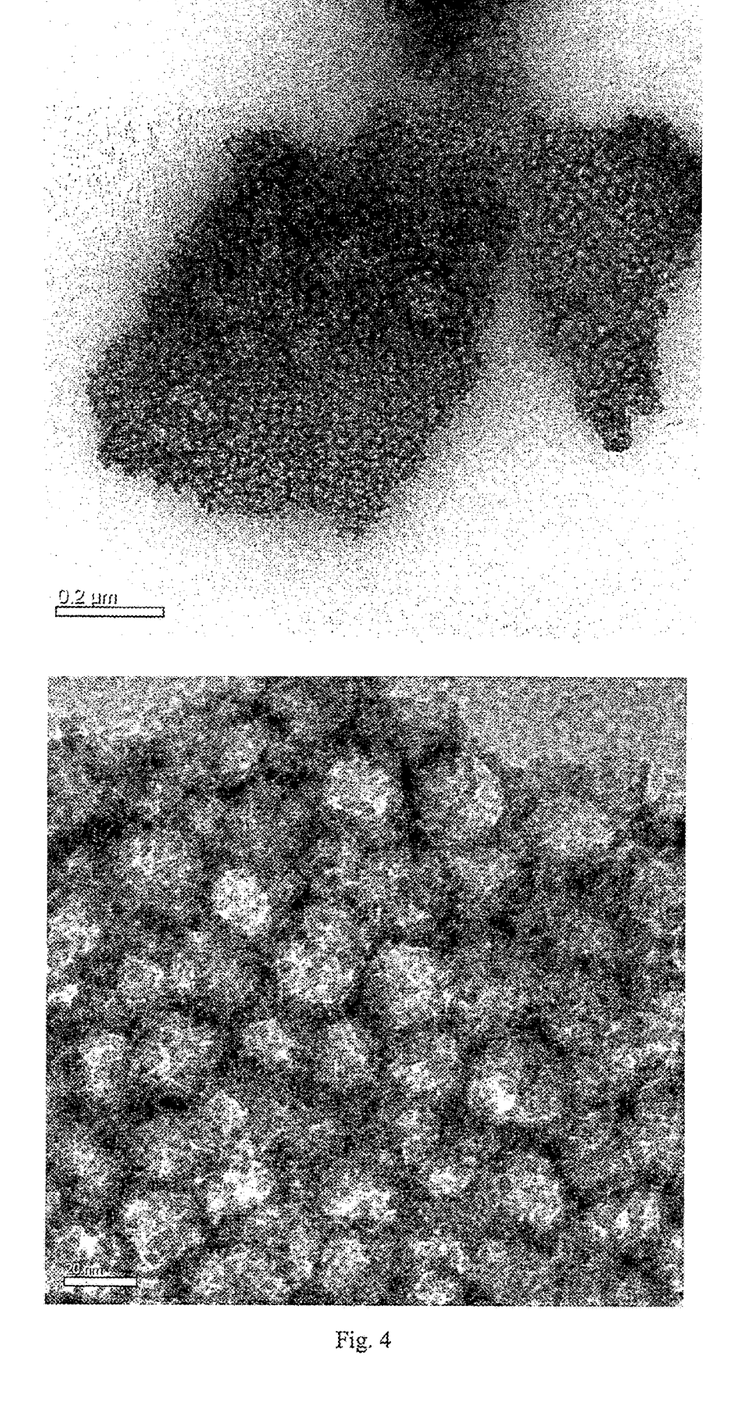
FIG. 4. TEM images of ceria-3.
Figure 5:
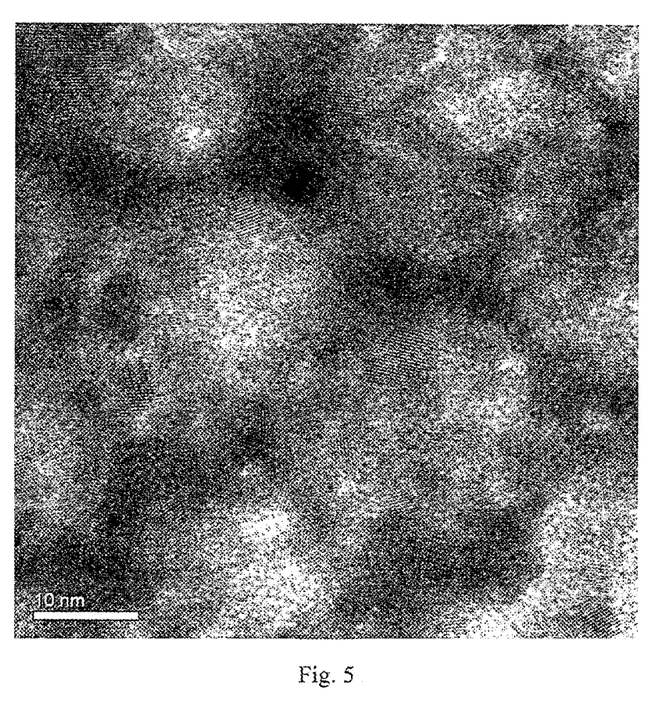
FIG. 5. HRTEM image of ceria-3.
Figure 6:
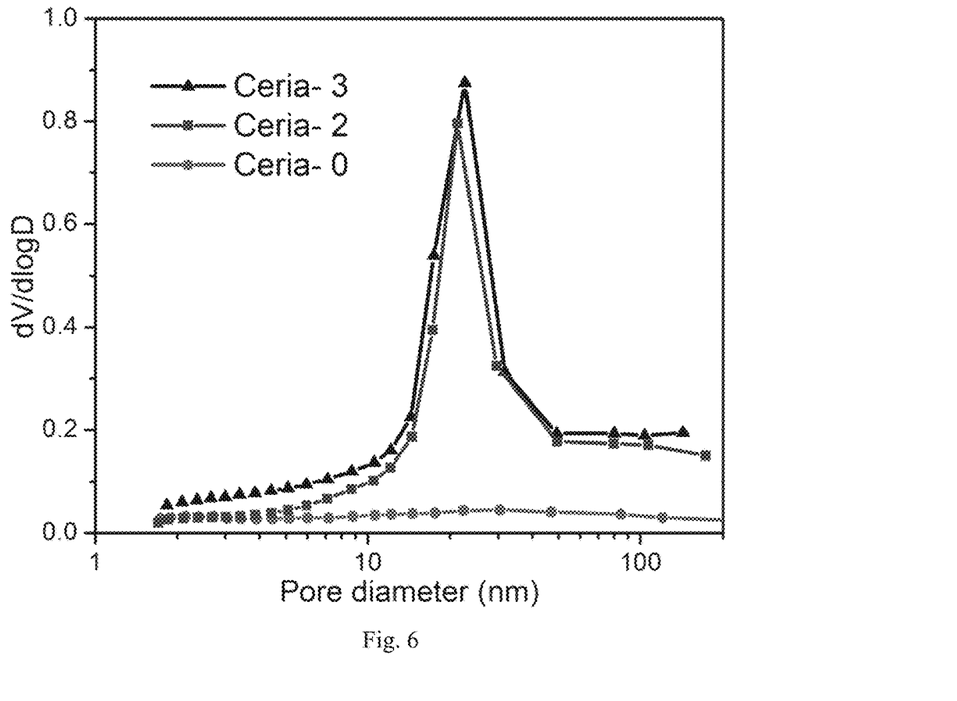
FIG. 6. BJH pore size distribution plots for different $CeO_2$ samples.
Figure 8:
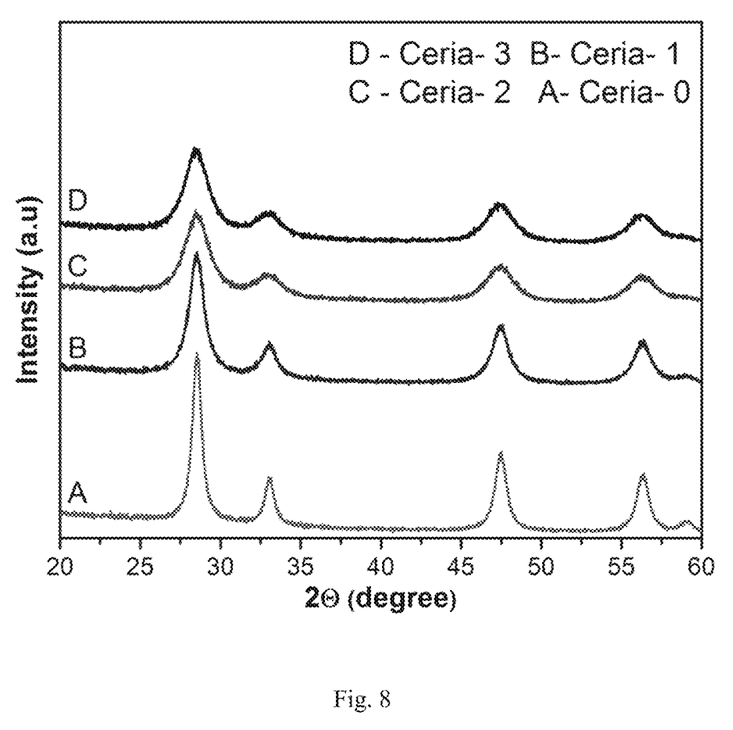
FIG. 8. XRD patterns for different $CeO_2$ samples of the invention.

To investigate the effect of colloidal template on CSCS, and to explore the tunability of porous structures formed, four samples of $CeO_2$ were synthesized by discovered method with incremental amount of $SiO_2$ added. Table 1 below shows the volume of colloidal silica added to 5 ml of aqueous $CH_2NH_2COOH/Ce(NO_3)_3$ solution. The resulting samples are denoted as ceria-0, ceria-1, ceria-2, and ceria-3. FIGS. 2 and 4 show typical TEM images of the colloidal $SiO_2$ particles and corresponding synthesized $CeO_2$ product of ceria-3. A highly porous $CeO_2$ with uniform spherical cavities is clearly visible in FIGS. 4 and 5. From the TEM and SEM images of FIGS. 3 and 5, the pore size is approximately 20-22 nm. The size and uniformity is consistent with the sharp peak in the BJH pore size distribution determined by $N_2$ sorption measurement shown in FIG. 6 and is in agreement with the size of the colloidal particles shown in FIG. 2. X-ray diffraction (XRD) patterns of the $CeO_2$ samples in FIG. 8 have well-defined peaks that can be indexed to the face-centered cubic phase of $CeO_2$ (Fm3m, JCPDS, file No. 34-0394). The peaks broaden successively from ceria-0 to ceria-3, with each additional amount of $SiO_2$ colloid added into the precursor, indicating a corresponding decrease in size of $CeO_2$ nanocrystals (Table 1). The average crystalline size of ceria-3 sample calculated from Scherrer equation using (111) peak was found to be ~4.1 nm, in good agreement with what is observed in the TEM images.

Figure 7:
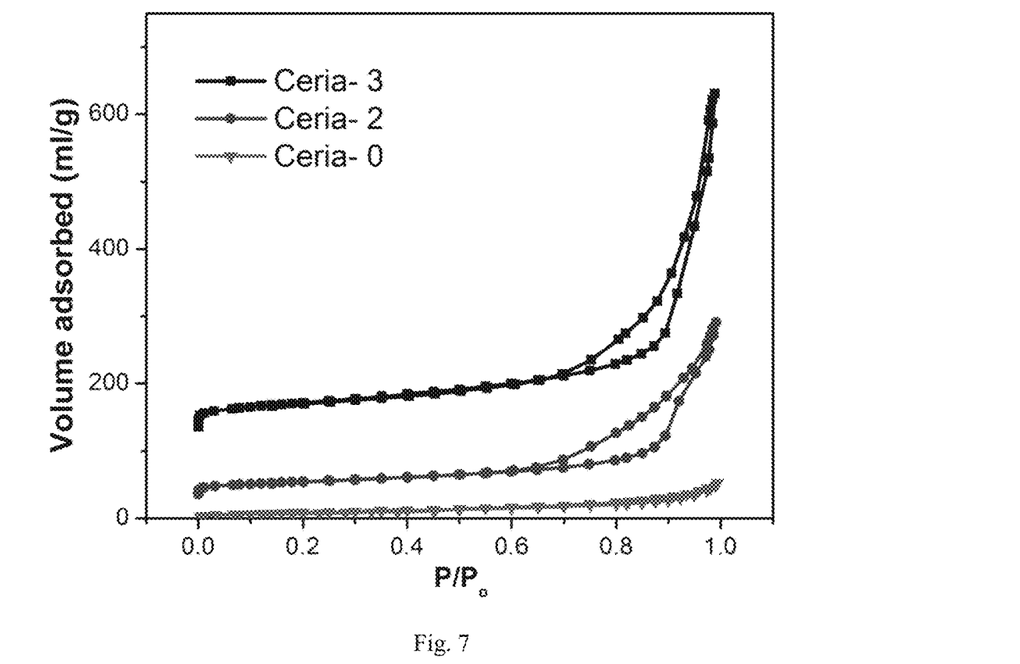
FIG. 7. $N_2$ sorption isotherms vertically shifted for clarity for different $CeO_2$ samples.

As shown in Table 1 below, pore volume and surface area of the product increases monotonically with addition of $SiO_2$ colloids. Ceria-3 has a very large pore volume of 0.6 ml/g, in contrast to 0.06 ml/g for ceria-0 synthesised by conventional SCS. The porosity estimated from pore volume of 0.6 ml/g and $CeO_2$ density (7.28 g/ml) is 81%, which is higher than the theoretical limit (74%) of closed packed spherical cavities. The additional porosity above the closed packed spheres limit may come from micropores between the $CeO_2$ nanocrystals since the measured micropore volume is 0.075 ml $g^{-1}$ equivalent to 12.5% porosity. (The presence of micropores corresponds to the steep rise in the $N_2$ isotherm (FIG. 7) at low pressure (<0.01). The estimated porosity of 81% approaches the value (>90%) of common aerogels which are open frameworks formed by networked nanoparticles. FIG. 4 also shows open porous structures formed by connected nanoparticles, features which are similar to those of aerogels. The $CeO_2$ from invented method, however, have uniform spherical cavities that are partially ordered, as opposed to unorganized and irregular pores in aerogels. The CSCS prepared $CeO_2$ give the highest values of pore volume compared to other literature values of hard template synthesized $CeO_2$. Close examination of the TEM image reveals that the pore wall is about 5 nm thick and is made up of crystalline $CeO_2$ particles 3 to 4 nm in diameter.

Special operating conditions of the invented method help to avoid coagulation of $SiO_2$ colloids, which is necessary for forming a uniform and high porosity product. The colloids can be stabilized by surface charges, according to the Derjaguin, Landau, Verwey and Overbeek (DLVO) theory. The presence of deprotonated surface silanol groups is confirmed by measured zeta-potential of −25.8 mV. After addition into $Ce(NO_3)_3$ and $CH_2NH_2COOH$ mixture, the zeta potential becomes positive (12.9 mV) due to adsorption of $Ce^{3-}$ cations. The charge reversal of $SiO_2$ surface maintains electrostatic repulsion and prevents coagulation, as similarly reported for trivalent cations adsorbed onto $SiO_2$. Glycine molecules are also positively charged in the acidic solution of pH 4.5 and when adsorbed further contribute to repulsion by charge as well as steric hindrance.

Figure 9:
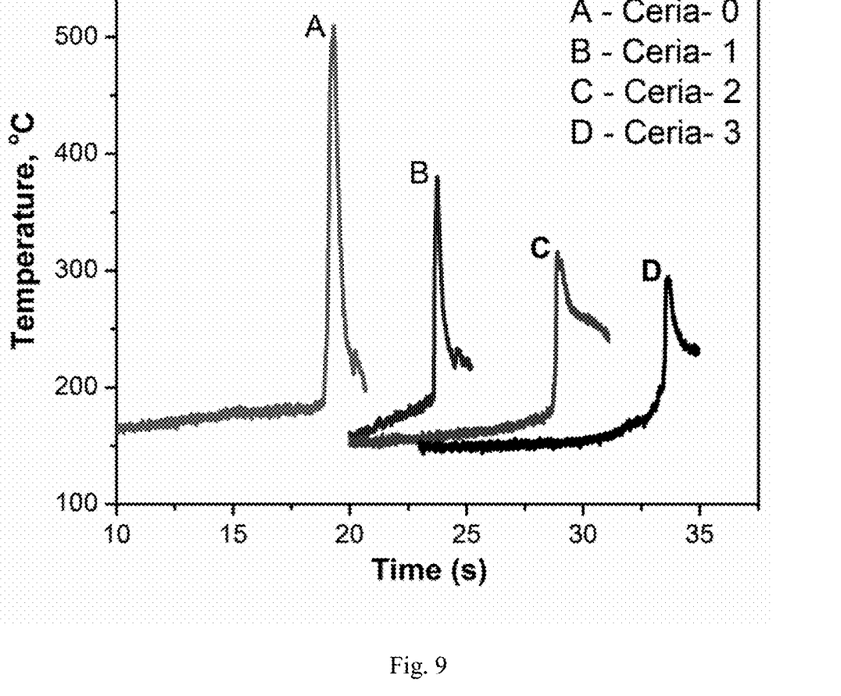
FIG. 9. Temperature-time profiles for different $CeO_2$ samples.

Mechanistic details of combustion in a colloidal $SiO_2$ matrix can be very complicated as heat transfer, gas evolution, expansion, compression, nucleation and solid growth occur in a very short time in nanoscale volume between $SiO_2$ colloids. The uniformity of cavities (FIG. 4 and FIG. 5) demonstrates the absence of colloids coagulation and no collapse of pores during $SiO_2$ removal. In contrast, though conventional SCS have the same chemistry, the heat transfer, gas evolution and nucleation and growth occur in an unorganized manner over a large length scale, without the regulation of a colloidal $SiO_2$ matrix. Typical temperature-time profiles of the different $CeO_2$ samples are shown in FIG. 9. The maximum temperature decreases from 510° C. for ceria-0 to 295° C. for ceria-3, as shown in FIG. 9. The presence of $SiO_2$ colloids promotes formation of small nanocrystals due to confinement of combustion and alteration of temperature profile. At the same time dispersed rigid spherical colloids create physical barriers that prevent contact and agglomeration of nanocrystals.

With the presence of a colloid, SCS is significantly modified in several fundamental aspects. Results for synthesized $CeO_2$ by invented method demonstrate 6-fold increase in surface area, 10-fold increase in pore volume, a narrow pore size distribution, partially ordered porosity, and 5-fold smaller particle size.

Figure 10:
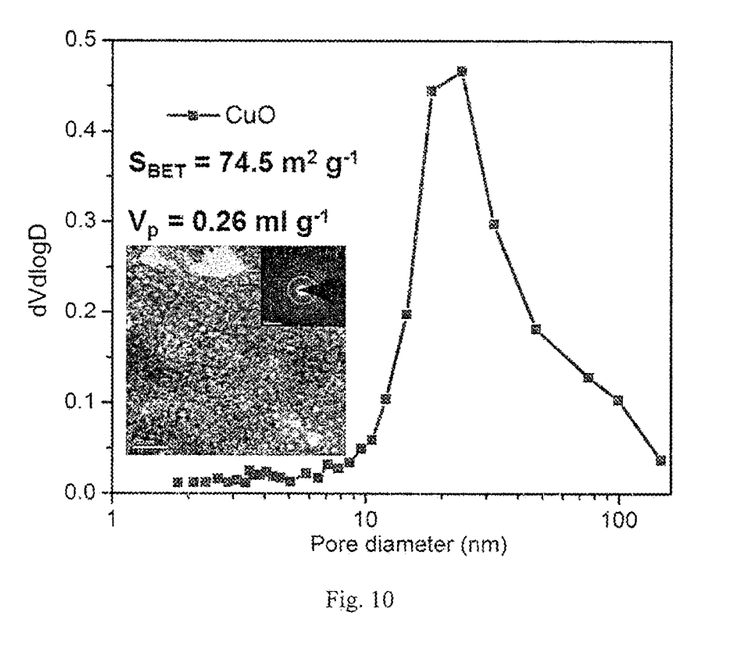
FIG. 10. BJH pore size distribution curve and TEM image (inset: SAED) of CuO synthesized in accordance with the methods described herein.

Discovered method can be generally applied to synthesize metal oxides with similar properties and results of synthesized CuO are shown in FIG. 10 with uniform pores of 22 nm, high pore volume, and high surface area.

The following examples illustrate the subject invention. Unless otherwise indicated in the following examples and elsewhere in the application text, all parts and percentages are by weight, all temperatures are in degrees Centigrade, and pressure is at or near atmospheric pressure.

EXAMPLES

Example 1

Synthesis of Uniform Mesoporous $CeO_2$ with Uniform 22 nm Pores

The typical synthesis method of the $CeO_2/SiO_2$ nanocomposite is outlined below. For each experiment, 10 g of $Ce(NO_3)_3 \cdot 6H_2O$, 2 g of $CH_2NH_2COOH$ were dissolved in 30 ml of water and varying amounts of colloidal silica (LUDOX TMA) 22 nm dia. were added (Table 1). In the following, the samples synthesized will be referred to as $CeO_2$-0, $CeO_2$-1 etc. according to Table 1 below. The solution was transferred into the beaker (volume 100 ml) and heated at 200° C. on a hot plate. After several minutes, combustion occurred with a rapid increase in temperature due to the exothermic reaction between the $Ce(NO_3)_3$ and $CH_2NH_2COOH$ yielding $CeO_2/SiO_2$ nanocomposite. The resulting powder obtained was immersed in 2 M NaOH at 80° C. for 6 h. The samples were subsequently washed with water and ethanol three times and dried at 120° C. to obtain pure mesoporous $CeO_2$.

TABLE 1

Textural parameters of produced different $CeO_2$ samples.

| Sample | ceria-0 | ceria-1 | ceria-2 | ceria-3 |
|---|---|---|---|---|
| Volume of $SiO_2$ added (mL) | 0 | 0.2 | 0.5 | 1 |
| $T_{max}$ (° C.) | 510 | 379 | 315 | 295 |
| $S_{BET}$ (m²/g) | 13.7 | 39.3 | 62.8 | 81.7 |
| BJH Pore volume (ml/g) | 0.06 | 0.23 | 0.41 | 0.6 |
| Average pore size (nm) | 9.6 | 13.6 | 21.7 | 22 |
| XRD particle size (nm) | 12.1 | 7.6 | 5 | 4.1 |

TABLE S1

Amount of $SiO_2$ colloids added for preparation of different $CeO_2$ samples.

| Sample | ceria-0 | ceria-1 | ceria-2 | ceria-3 |
|---|---|---|---|---|
| Volume of colloidal $SiO_2$ solution added (ml) | 0 | 0.2 | 0.5 | 1 |
| Volume of $Ce(NO_3)_3$—$CH_2NH_2COOH$ aq. Solution (ml) | 5 | 5 | 5 | 5 |

Characterization

K-type thermocouples with 0.1 mm diameter were used to monitor the temperature of the reaction over time. The output signals of the thermocouples were passed to a computer using a multichannel data acquisition line (Data Translation Inc.) with a monitoring frequency of 1 kHz using Quick DAC software. At least three measurements were performed to obtain the data. The compositions of as-synthesized powders were determined using powder X-ray diffraction (XRD) with $CuK_\alpha$ radiation at 40 kV and 40 mA (D8 Advance, Bruker). The powder microstructures were examined by scanning electron microscopy (SEM) (Hitachi S-4800 with an accelerating voltage of 7 kV). Transmission electron microscopy (TEM) and selected area electron diffraction (SAED) studies were conducted to characterize the structure and composition of the reaction products (Phillips Tecnai 20 with an accelerating voltage of 200 kV). A Micromeritics ASAP 2020 analyzer was used to obtain the Brunauer-Emmet-Teller (BET) surface areas and Barrett-Joyner-Halenda (BJH) pore size distributions of oxides using nitrogen as the adsorbent gas at 77K. Oxide powders were degassed at 473K and $10^{-6}$ Torr overnight under the vacuum prior to the analysis. Zeta potential was measured by Zetasizer (Malvern UK).

Example 2

Synthesis of Uniform Mesoporous CuO with Uniform 22 nm Pores

The typical synthesis method of the $CuO/SiO_2$ nanocomposite is outlined below. For each experiment, 10 g of $Cu(NO_3)_2 \cdot 2H_2O$, 2.19 g of $CH_2NH_2COOH$ were dissolved in 30 ml of water and 5 ml of colloidal silica (LUDOX TMA) 22 nm dia. were added. The solution was transferred into the beaker (volume 100 ml) and was heated at 200° C. on a hot plate. After several minutes, combustion occurred with a rapid increase in temperature due to the exothermic reaction between the $Cu(NO_3)_2$ and $CH_2NH_2COOH$ yielding $CuO/SiO_2$ nanocomposite. The resulting powder obtained was immersed in 2 M NaOH at 80° C. for 6 h. The samples were subsequently washed with water and ethanol three times and dried at 120° C. to obtain pure mesoporous CuO.

Example 3

Synthesis of Uniform Mesoporous NiO with uniform 22 nm pores

The typical synthesis method of the NiO/SiO$_2$ nanocomposite is outlined below. For each experiment, 20 g of Ni(NO$_3$)$_2$.2H$_2$O, 3.1 g of CH$_2$NH$_2$COOH were dissolved in 50 ml of water and 10 ml of colloidal silica (LUDOX TMA) 22 nm dia. were added. The solution was transferred into the beaker (volume 100 ml) and was heated at 200° C. on a hot plate. After several minutes, combustion occurred with a rapid increase in temperature due to the exothermic reaction between the Ni(NO$_3$)$_2$ and CH$_2$NH$_2$COOH producing NiO/SiO$_2$ nanocomposite. The resulting powder obtained was immersed in 1 M NaOH at 80° C. for 10 h. The samples were subsequently washed with water and ethanol three times and dried at 120° C. to obtain pure mesoporous NiO.

Example 4

Synthesis of Uniform Mesoporous CeO$_2$ with uniform 12 nm pores

The typical synthesis method of the CeO$_2$/SiO$_2$ nanocomposite is outlined below. For each experiment, 15 g of Ce(NO$_3$)$_3$.6H$_2$O, 2.25 g of CH$_2$NH$_2$COOH were dissolved in 40 ml of water and 23 ml of colloidal silica (LUDOX CL) 12 nm dia. were added No data is added in Table 1. The solution was transferred into the beaker (volume 100 ml) and heated at 200° C. on a hot plate. After several minutes, combustion occurred with a rapid increase in temperature due to the exothermic reaction between the Ce(NO$_3$)$_3$ and CH$_2$NH$_2$COOH yielding CeO$_2$/SiO$_2$ nanocomposite. The resulting powder obtained was immersed in 2 M NaOH at 80° C. for 6 h. The samples were subsequently washed with water and ethanol three times and dried at 120° C. to obtain pure mesoporous CeO$_2$.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of precursors, reaction conditions, etc., used in the application text are to be understood as modified in all instances by the term "about."

It should be understood that the examples and embodiments described herein are for illustrative purposes only and that various modifications or changes in light thereof will be suggested to persons skilled in the art and are to be included within the spirit and purview of this application.

What is claimed is:

1. A method of synthesizing a porous material via combustion of a colloidal solution comprising:
   a) preparing a colloidal solution by dissolving in water a fuel and an oxidant and dispersing colloidal particles, wherein the fuel comprises amino acid, amide, thioamide, citrate, oxalate, alcohol, hydrazine or its derivative, or amine or combinations thereof;
   b) heating the solution to ignition and initiate a combustion to produce a composite material comprising colloidal particles via an exothermic process; and
   c) dissolving the colloidal particles to create uniform porosity.

2. The method of claim 1 further comprising a metal precursor, wherein the oxidant is the metal precursor.

3. The method of claim 2 wherein the amino acid is one or more of glycine, alanine, arginine, asparagine, aspartic acid, cysteine, glutamine, proline, or tryptophan; and/or
   wherein the amide is formamide, ethanamide, propanamide, or butanamide; and/or
   wherein the thioamide is thioformamide, thioethanamide, thiopropanamide, or thiobutanamide; and/or
   wherein the citrate is citric acid, trisodium citrate, or ammonium citrate; and/or
   wherein the oxalate is oxalic acid, or dimethyl oxalate; and/or
   wherein the alcohol is ethylene glycol, glycerol or furfuryl alcohol; and/or
   wherein the hydrazine and its derivative is hydrazine hydrate, hydrazine hydrochloride, acetyl hydrazine, 1,2,4-triazole, 2-amino1,2,4-triazole, or 4-amino1,2,4-triazole; and/or
   wherein the amine is ethylene diamine.

4. The method of claim 1 wherein the colloidal particle comprises an oxide or a metal or combinations thereof.

5. The method of claim 4 wherein the oxide is one or more of SiO$_2$, Al$_2$O$_3$, CeO$_2$, Fe$_2$O$_3$, TiO$_2$, ZrO$_2$, Fe$_3$O$_4$, ZnO, WO$_3$, CuO, Cu$_2$O, MoO$_3$, Y$_2$O$_3$, Sm$_2$O$_3$, Gd$_2$O$_3$, or Co$_3$O$_4$; and/or
   wherein the metal is one or more of Ag, Au, Pt, Pd, Ru, Rh, Ni, Co, Fe, Cu, Zr or Ti; and/or
   wherein diameter of the oxide is in a range from 5 to 200 nm; and/or
   wherein diameter of the metal is in a range from 2 to 200 nm.

6. The method of claim 1 wherein the oxidant is a nitrate; and/or
   wherein the oxidant comprises one or more of Ce(NO$_3$)$_3$, Cu(NO$_3$)$_2$, Pd(NO$_3$)$_2$, Al(NO$_3$)$_3$, AgNO$_3$, Zn(NO$_3$)$_2$, TiO(NO$_3$)$_2$, ZrO(NO$_3$)$_2$, Ni(NO$_3$)$_2$, Co(NO$_3$)$_2$, Mg(NO$_3$)$_2$, Sr(NO$_3$)$_2$, Ba(NO$_3$)$_2$, Y(NO$_3$)$_3$, LiNO$_3$, NaNO$_3$, KNO$_3$, Cr(NO$_3$)$_3$, Mn(NO$_3$)$_2$, Bi(NO$_3$)$_3$, Mg(NO$_3$)$_2$, Pb(NO$_3$)$_2$, La(NO$_3$)$_3$, NH$_4$NO$_3$, Ce(NH$_4$)$_2$(NO$_3$)$_6$, Pr(NO$_3$)$_3$, Sm(NO$_3$)$_3$, Eu(NO$_3$)$_3$, In(NO$_3$)$_3$, Gd(NO$_3$)$_3$, Sc(NO$_3$)$_3$ or Tb(NO$_3$)$_3$; and/or
   wherein the ratio of oxidant to fuel is 5:1 to 0.2:1; and/or
   wherein the ratio of oxidant to dispersing colloidal particles is 1:0.2 to 1:5; and/or
   wherein the step of heating comprises removing water from the colloidal solution to obtain a gel; and/or
   wherein during removing water from the colloidal solution to obtain a gel, the heating rate is between 0.1 degree Celsius per minute and 50 or 100 degree Celsius per minute up to ignition of the gel in open air, wherein after the ignition the reaction is exothermic yielding oxide/colloid composite material; and/or
   wherein the colloidal particle is removed by chemical etching to produce uniform porous oxide, wherein chemical etching comprising of etching of colloid by NaOH, KOH, HF, HCl, HNO$_3$, H$_2$SO$_4$, KCN, or CH$_3$COOH or combinations thereof; and/or
   wherein the pore diameter of porous oxide has a size from 2 nm to 200 nm; and/or
   wherein the method comprises using a produced uniform porous oxide of the porous material in a coating, polishing slurry or paste, a catalyst, a gas sensing device, an optical device, a battery device, a storage device, a ceramic, or a magnetic device; and/or further comprising a metal precursor, the metal precursor comprises metal chloride, metal sulfate, or metal sulfide; and/or the metal precursor does not support combustion of the fuel and become a dopant or active component in the porous material.

7. A method of synthesizing a composite material via combustion of a colloidal solution comprising:
   a) preparing a colloidal solution by dissolving in water a fuel and an oxidant, and dispersing colloidal particles, wherein the fuel comprises amino acid, amide, thioamide, citrate, oxalate, alcohol, hydrazine or its derivative, or amine or combinations thereof; and
   b) heating the solution to ignition and initiate a combustion to produce a composite material comprising colloidal particles within an oxide via an exothermic process for applications as a coating, polishing slurry or paste, a catalysis, a gas sensing device, an optical device, a battery device, a storage device, a ceramic, or a magnetic device.

8. A method of making a porous nanomaterial, comprising:
   combining colloidal nanoparticles with a nitrate and a fuel in an aqueous solution;
   heating the aqueous solution to form a gel;
   permitting an exothermic reaction to proceed to form a nanocomposite material; and
   removing colloidal nanoparticles from the nanocomposite material to provide a porous nanomaterial.

9. The method of claim 8, wherein the nanocomposite material comprises colloidal nanoparticles embedded therein; and/or
   wherein the porous nanomaterial comprises a porous crystalline nanomaterial; and/or
   wherein the porous nanomaterial comprises pores having a diameter from 2 to 200 nm or 2 to 100 nm; and/or
   wherein the colloidal nanoparticles are removed from the nanocomposite material by chemical etching.

10. The method of claim 7, wherein the colloidal solution is prepared by dissolving in water the fuel, the oxidant, and a metal precursor.

11. The method of claim 10 wherein the oxidant is the metal precursor.

12. The method of claim 8, wherein the colloidal solution is prepared by dissolving in water the fuel, the oxidant, and a metal precursor.

13. The method of claim 12 wherein the oxidant is the metal precursor.

* * * * *